J. W. Hayes,
Fruit Basket,
Nº 15,514.   Patented Aug. 12, 1856.
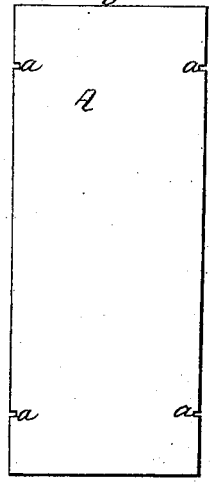
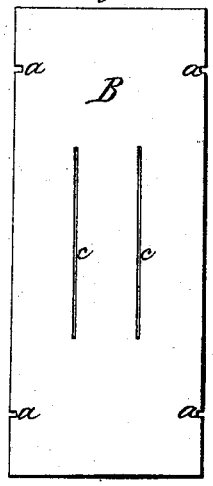
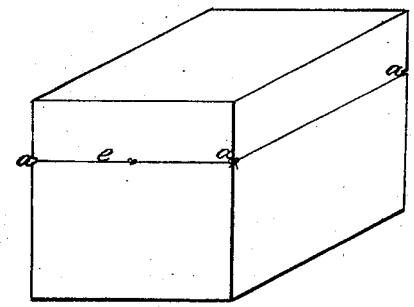
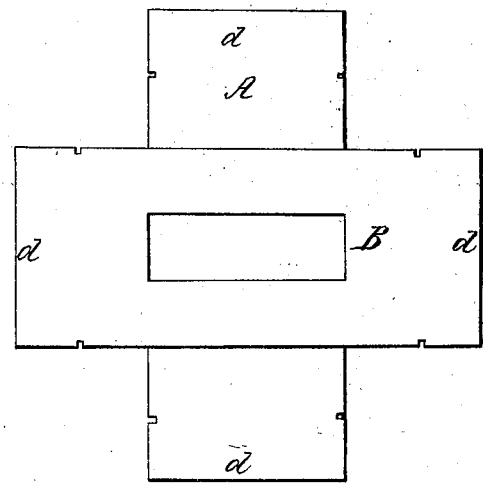
Witnesses;
Isaac Kent
Stephen Ennis
Inventor;
J. W. Hayes

UNITED STATES PATENT OFFICE.

J. W. HAYES, OF NEWARK, NEW JERSEY.

FRUIT-BOX.

Specification forming part of Letters Patent No. 15,514, dated August 12, 1856.

*To all whom it may concern:*

Be it known that I, JABEZ W. HAYES, of the city of Newark, in the county of Essex and State of New Jersey, have invented a new and improved box or basket for the purpose of holding berries or other fruit, which box or basket can be made at a cost so low as to allow of their being sold with the fruit without any charge to the consumer, thereby avoiding the necessity of transferring the fruit from the box or basket when sold; and I do hereby declare that the following is a full and exact description of the nature of my invention and the manner of construction, accompanied with the proper drawings and model.

A and B, Figures 1 and 2, are pieces of veneering from five to eight inches long and from two to four inches wide, or the same may be made either larger or smaller, into which are cut notches or slots $a\ a\ a\ a$, Fig. 1, from one-eighth to one-fourth of an inch deep and from one-half to one and one-half inch from the ends of the veneering A and B.

$c\ c$ are longitudinal cuts or openings made into the veneering B, Fig. 2, from two to four inches long and from one-half to one and a half inch from the edges of the veneering, the said cuts or openings being intended to allow the passing of the piece of veneering A through the piece of the veneering B, thus interweaving the two pieces of veneering together, as shown in Fig. 3, thereby forming the bottom of the box or basket. The ends of the veneering $d\ d\ d\ d$, Fig. 3, are then bent at right angles with the bottom, thereby forming a square box, as shown in Fig. 4. A cord, $e$, Fig. 4, of the proper length, having the ends fastened together, is passed over the box and entered into the notches or slots $a\ a\ a\ a$, which properly secures the cord in its place, the said cord holding the different parts of the box together in a proper form, as shown in Fig. 4.

What I claim as my invention, and for which I desire Letters Patent, is—

The combination of the two pieces of veneering A and B with the notches or slots $a\ a\ a\ a$ and the longitudinal openings $c\ c$, interwoven at the center, bent at right angles and secured together by the cord $e$ in the slots $a\ a\ a\ a$, as before described, and for the purpose before mentioned.

J. W. HAYES.

In presence of—
   ISAAC KENT,
   STEPHEN ENNIS.